US009906670B2

(12) United States Patent
Hayashi et al.

(10) Patent No.: US 9,906,670 B2
(45) Date of Patent: Feb. 27, 2018

(54) ADAPTIVE MODE IMAGE FORMING APPARATUS

(71) Applicant: KYOCERA Document Solutions Inc., Osaka-shi, Osaka (JP)

(72) Inventors: Hironori Hayashi, Osaka (JP); Yuya Tagami, Osaka (JP); Kunihiko Shimamoto, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 15/084,570

(22) Filed: Mar. 30, 2016

(65) Prior Publication Data

US 2016/0295049 A1 Oct. 6, 2016

(30) Foreign Application Priority Data

Mar. 31, 2015 (JP) ................................. 2015-072617
Mar. 31, 2015 (JP) ................................. 2015-072618
Mar. 31, 2015 (JP) ................................. 2015-072619

(51) Int. Cl.
*H04N 1/00* (2006.01)

(52) U.S. Cl.
CPC ....... *H04N 1/00803* (2013.01); *H04N 1/0032* (2013.01); *H04N 1/00588* (2013.01); *H04N 1/00689* (2013.01); *H04N 1/00694* (2013.01); *H04N 2201/0094* (2013.01)

(58) Field of Classification Search
CPC ............. H04N 1/00803; H04N 1/0032; H04N 1/00588; H04N 1/00689; H04N 1/00694; H04N 2201/0094
See application file for complete search history.

(56) References Cited

U.S. PATENT DOCUMENTS

2001/0051064 A1* 12/2001 Yokoyama ......... H04N 1/00931
400/70
2015/0360461 A1* 12/2015 Sakata ...................... B26F 1/00
101/27

FOREIGN PATENT DOCUMENTS

JP H11133814 A 5/1999
JP H11194676 A 7/1999

* cited by examiner

*Primary Examiner* — Iriana Cruz

(57) ABSTRACT

An image forming apparatus includes an image reading unit, an image forming unit, an acceptance unit, a paper transporting unit, a mode selecting unit, and a control unit. The image reading unit includes a document transporting device, a loaded-document detecting unit, a document table, a document holder, and a placed-document detecting unit. The mode selection unit can select a first mode in which paper is transported at the start of image reading operation and a second mode in which paper is transported after the image reading operation. If the loaded-document detecting unit detects that a document has not been loaded in a loading position and the placed-document detecting unit detects that a document has not been placed on the document table, the control unit controls the mode selection unit to select the second mode and controls the image reading unit to read an image on the document table.

4 Claims, 9 Drawing Sheets

ADAPTIVE MODE IMAGE FORMING APPARATUS

INCORPORATION BY REFERENCE

The disclosures of Japanese Patent Applications No. 2015-72617, No. 2015-72618, and No. 2015-72619 filed on Mar. 31, 2015 each including the specification, drawings and abstract are incorporated herein by reference in their entirety.

BACKGROUND

The present disclosure relates to an image forming apparatus.

Image forming apparatuses, typified by digital multifunction peripherals, read an image of an original document by using an image reading unit, and then emit light to a photoreceptor in an image forming unit based on the read image to form an electrostatic latent image on the photoreceptor. Then, a charged developer, including toner and other components, is applied onto the formed electrostatic latent image to make it into a visible image that is in turn transferred onto a sheet of paper and fixed. The sheet with the image fixed thereon is discharged outside the image forming apparatus.

There are well-known techniques to reduce operational errors of users who manipulate the image forming apparatus.

A typical image forming apparatus includes an image reading unit, an image forming unit that reads a document on the image reading unit and forms an image of the document on recording paper, and a feeding unit that feeds the document to the image reading unit, and further includes a document transporting unit that is openable/closable with respect to the image reading unit, a document presence/absence detecting unit that detects whether a document is present in the document transporting unit, an open/close detecting unit that detects the opening and closing of the document transporting unit, and a closed-state duration time storage device that records the time elapsed since a close signal has been generated by the open/close detecting unit until the current time. The typical image forming apparatus controls the image forming unit not to operate, even if a user depresses a button to start forming an image, when the document presence/absence detecting unit detects the absence of the document and the closed-state duration time of the document transporting unit stored in the close-state duration time storage device is equal to or exceeds a predetermined period of time.

Another typical image forming apparatus includes a feed-slot selecting unit that selects a copying operation to be performed after transfer paper is inserted into a manual feed slot for manual copying, a detecting unit that detects the presence or absence of the transfer paper in the manual feed slot, and a detecting unit that detects the paper size of the manual feed slot. The typical image forming apparatus can select between a mode allowing copying operation when the detecting unit for detecting the presence or absence of the transfer paper detects the presence of the transfer paper, and a mode allowing copying operation when the feed-slot selecting unit selects the manual feed slot irrespective of the output from the detecting unit. In addition, even if the mode allowing copying operation when the feed-slot selecting unit selects the manual feed slot irrespective of the output from the detecting unit is selected, the image forming apparatus can disable copying operation except when the paper size of the manual feed slot is the minimum.

SUMMARY

In one aspect of the present disclosure, an image forming apparatus includes an image reading unit, an image forming unit, an acceptance unit, a paper transporting unit, a mode selecting unit, and a control unit. The image reading unit includes a document transporting device that transports a document loaded in a loading position to a reading position, a loaded-document detecting unit that detects whether the document has been loaded in the loading position, a document table on which the document to be read is placed, a document holder that can be closed to cover an upper surface of the document table and can be opened to make a space above the document table, has a white back face facing the document table, and holds the document placed on the document table, and a placed-document detecting unit that detects whether the document has been placed on the document table. The image reading unit reads an image of at least one of the document loaded in the document transporting device and the document placed on the document table. The image forming unit forms an image based on the image read by the image reading unit. The acceptance unit accepts a request for the image forming unit to perform image formation. The paper transporting unit transports a paper sheet on which the image is to be formed to the image forming unit. The mode selection unit can select at least one of a first mode in which the paper transporting unit starts transporting a paper sheet when the image reading unit starts reading the image and a second mode in which the paper transporting unit starts transporting a paper sheet after the image reading unit finishes reading the image. When the acceptance unit accepts an image formation request, if the loaded-document detecting unit detects that the document has not been loaded in the loading position and the placed-document detecting unit detects that the document has not been placed on the document table, the control unit controls the mode selection unit to select the second mode and controls the image reading unit to read an image on the document table.

In another aspect of the present disclosure, an image forming apparatus includes an image reading unit, an image forming unit, an acceptance unit, a paper transporting unit, a mode selecting unit, a first control unit, and a second control unit. The image reading unit includes a document transporting device that transports a document loaded in a loading position to a reading position, a loaded-document detecting unit that detects whether the document has been loaded in the loading position, a document table on which the document to be read is placed, a document holder that can be closed to cover an upper surface of the document table and can be opened to make a space above the document table, has a white back face facing the document table, and holds the document placed on the document table, and a document-holder open/close detecting unit that detects whether the document holder was opened within a predetermined period of time. The image reading unit reads an image of at least one of the document loaded in the document transporting device and the document placed on the document table. The image forming unit forms an image based on the image read by the image reading unit. The acceptance unit accepts a request for the image forming unit to perform image formation. The paper transporting unit transports a paper sheet on which the image is to be formed to the image forming unit. The mode selection unit can select at least one of a first mode in which the paper transporting unit starts transporting paper when the image reading unit starts reading the image and a second mode in which the paper transporting unit starts transporting paper after the image reading unit finishes reading the image. When the acceptance unit accepts an image formation request, if the loaded-document detecting unit detects that the document has not been loaded in the loading position and the document-holder open/close detection unit detects that the document holder was not opened within the predetermined period of time, the first control unit controls the mode selection unit to select the second mode and controls the image reading unit to read an image on the document table. If the loaded-document detecting unit detects that the document has been loaded in the loading position while the first control unit is in operation, the second control unit controls the document transporting device to transport the document in the loading position to the reading position while controlling the mode selection unit to select the first mode, and controls the image forming unit to form an image based on the image of the document transported by the document transporting device and read by the image reading unit.

In still another aspect of the present disclosure, an image forming apparatus includes an image reading unit, an image forming unit, an acceptance unit, a paper transporting unit, a mode selecting unit, a third control unit, and a fourth control unit. The image reading unit includes a document transporting device that transports a document loaded in a loading position to a reading position, a loaded-document detecting unit that detects whether the document has been loaded in the loading position, a document table on which the document to be read is placed, a document holder that can be closed to cover an upper surface of the document table and can be opened to make a space above the document table, has a white back face facing the document table, and holds the document placed on the document table, and a document-holder open/close detecting unit that detects whether the document holder was opened within a predetermined period of time. The image reading unit reads an image of at least one of the document loaded in the document transporting device and the document placed on the document table. The image forming unit forms an image based on the image read by the image reading unit. The acceptance unit accepts a request for the image forming unit to perform image formation. The paper transporting unit transports a paper sheet on which the image is to be formed to the image forming unit. The mode selection unit can select at least one of a first mode in which the paper transporting unit starts transporting paper when the image reading unit starts reading the image and a second mode in which the paper transporting unit starts transporting paper after the image reading unit finishes reading the image. When the acceptance unit accepts an image formation request, if the loaded-document detecting unit detects that the document has not been loaded in the loading position and the document-holder open/close detecting unit detects that the document holder was not opened within the predetermined period of time, the third control unit controls the mode selection unit to select the second mode and controls the image reading unit to read an image on the document table. If an image is detected as being present on the document table while the image reading unit is reading the image on the document table, the fourth control unit controls the mode selection unit to select the first mode and controls the image forming unit to form an image based on the image read by the image reading unit.

DETAILED DESCRIPTION

Figure 1:
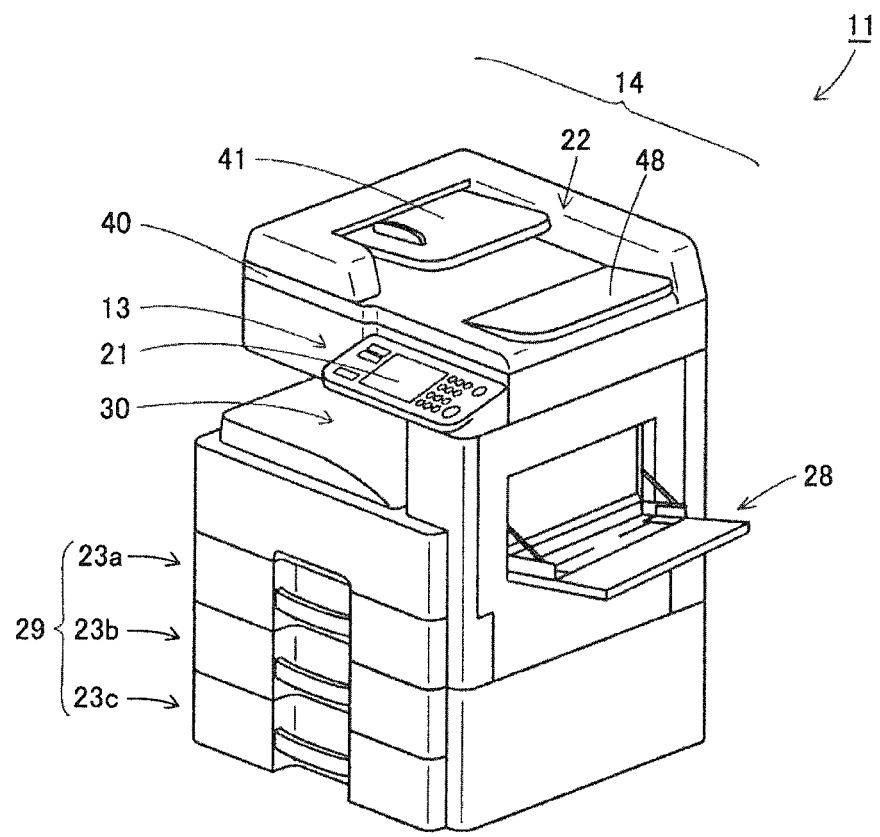
FIG. 1 is a schematic perspective view showing the appearance of a digital multifunction peripheral to which an image forming apparatus according to an embodiment of the present disclosure is applied, the digital multifunction peripheral having a document holder in a closed position.
Figure 2:
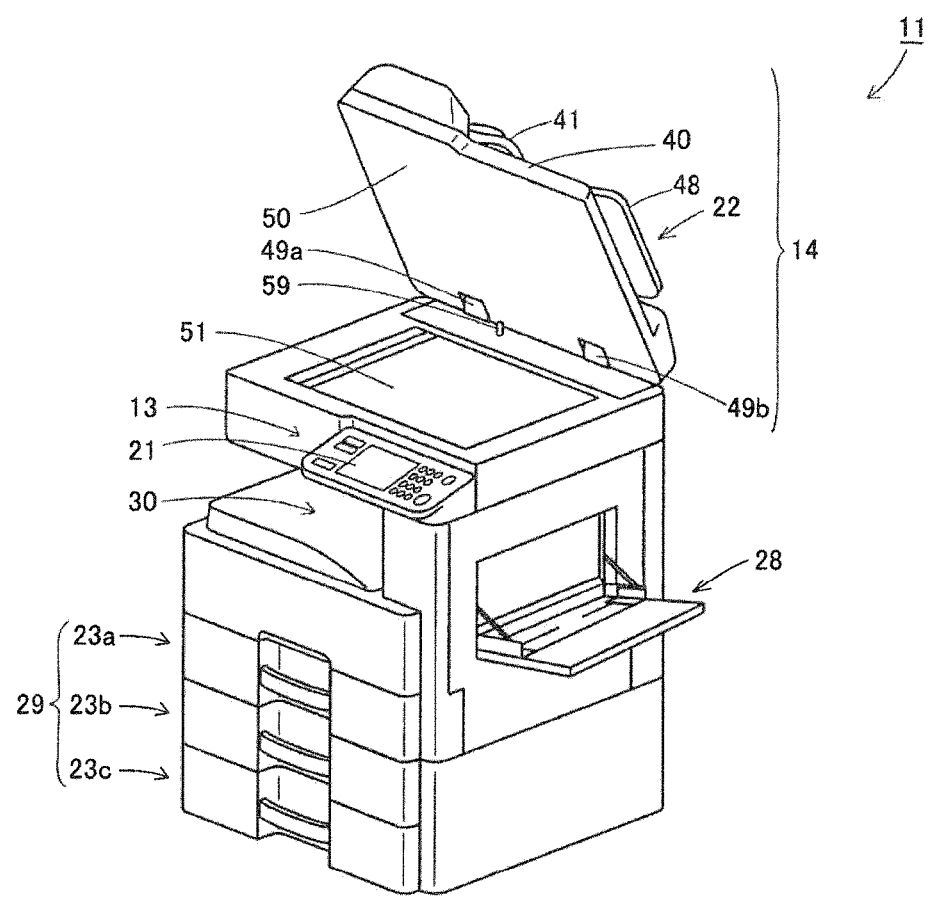
FIG. 2 is a schematic perspective view showing the appearance of the digital multifunction peripheral to which the image forming apparatus according to the embodiment of the present disclosure is applied, the digital multifunction peripheral having the document holder in an open position.
Figure 3:
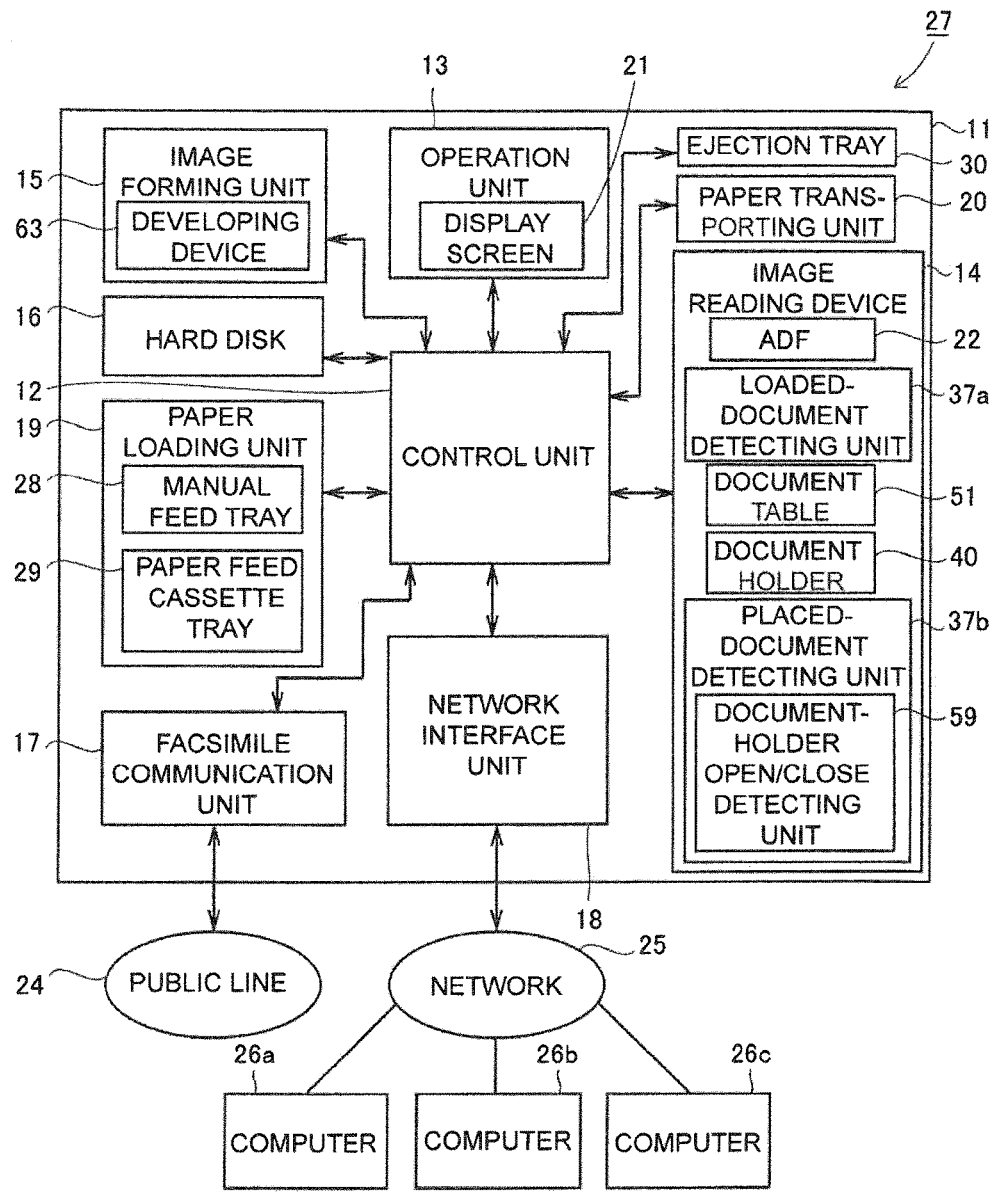
FIG. 3 is a block diagram showing the configuration of the digital multifunction peripheral to which the image forming apparatus according to the embodiment of the disclosure is applied.

Embodiments of the present disclosure will be described below. FIGS. 1 and 2 are schematic perspective views showing the appearance of a digital multifunction peripheral to which an image forming apparatus according to an embodiment of the disclosure is applied. FIG. 1 shows a document holder, which will be described later, in a closed position, while FIG. 2 shows the document holder in an open position. FIG. 3 is a block diagram showing the configuration of the digital multifunction peripheral to which the image forming apparatus according to the embodiment of the disclosure is applied.

Referring to FIGS. 1 to 3, the digital multifunction peripheral 11 includes a controller 12, an operation unit 13, an image reading unit 14 (also referred to as an "image reader"), an image forming unit 15 (also referred to as an "image former"), a paper loading unit 19, a paper transporting unit 20 (also referred to as a "paper transporter"), an ejection tray 30, a hard disk 16 serving as a storage unit for image data and other information, a facsimile communication unit 17, and a network interface unit 18 used to connect with a network 25.

The controller 12 controls the entire digital multifunction peripheral 11. The operation unit 13 includes a display screen 21 that displays information submitted from the digital multifunction peripheral 11 and entries made by users. The operation unit 13 allows the users to input image forming conditions, such as the number of copies and gradation degrees, and to turn on or off the power source. The image reading unit 14 includes an ADF 22 that is a document transporting device for transporting a document loaded in a loading position to a reading position, a loaded-document detecting unit 37a (also referred to as a "loaded-document detector") that detects that the document has been loaded in the loading position, a document table 51 on which the document to be read is placed, a document holder 40 that can be closed to cover the upper surface of the document table 51 and can be opened to make a space above the document table 51, has a white back face 50 facing the document table 51 and holds the document on the document table 51, and a placed-document detecting unit 37b that detects that a document has been placed on the document table 51. The image reading unit 14 reads an image of a document loaded in the ADF 22 or a document placed on the document table 51. The ADF 22 and the document holder 40 are integrally formed in one unit. Typically, the ADF 22 is formed in an upper part of the document holder 40. The paper loading unit 19 includes a manual feed tray 28 on which a paper sheet is manually loaded, and a paper feed cassette set 29 that can accommodate multiple sheets of paper. The paper loading unit 19 accommodates sheets of paper to be supplied to the image forming unit 15. The paper transporting unit 20 transports the paper loaded in the paper loading unit 19 to the image forming unit 15. The image forming unit 15 forms images, on the transported paper sheet, based on the images read by the image reading unit 14 or image data transmitted via the network 25. The paper transporting unit 20 transports the paper sheet with an image formed thereon to the ejection tray 30. The paper sheet with the images formed by the image forming unit 15 is ejected onto the ejection tray 30. The hard disk 16 stores the transmitted image data, the input image forming conditions, and so on. The facsimile communication unit 17 is connected to a public line 24 and performs facsimile transmission and reception.

The digital multifunction peripheral 11 also includes a dynamic random access memory (DRAM) where image data is written in or is read out from, and other components, but their pictorial representations and descriptions are omitted. Arrows in FIG. 3 indicate control signal flows and data flows relating to control operations and images. As shown in FIGS. 1 and 2, the paper feed cassette set 29 in this embodiment includes three paper feed cassettes 23a, 23b, 23c.

The digital multifunction peripheral 11 operates as a copier by causing the image forming unit 15 to form an image reading a document by the image reading unit 14. In addition, the digital multifunction peripheral 11 operates as a printer by receiving image data transmitted via the network interface unit 18 from computers 26a, 26b, 26c connected to the network 25 and causing the image forming unit 15 to form an image using the image data and print it on paper. Furthermore, the digital multifunction peripheral 11 operates as a facsimile by receiving image data transmitted from a public line 24 through the facsimile communication unit 17 and causing the image forming unit 15 to form an image using the image data, or by transmitting image data of a document, which is read by the image reading unit 14, through the facsimile communication unit 17 to the public line 24. In short, the digital multifunction peripheral 11 has a plurality of functions, such as a copying function, a printer function, and a facsimile function. The multifunction peripheral 11 also has a function of minutely setting each of the functions.

The digital multifunction peripheral 11 configured as described above and the computers 26a, 26b, 26c connected to the digital multifunction peripheral 11 via the network 25 establish an image processing system 27. This embodiment shows three computers 26a to 26c. Each of the computers 26a to 26c can make a print request via the network 25 to the digital multifunction peripheral 11 to perform printing. The digital multifunction peripheral 11 may be connected to the computers 26a to 26c with wires, such as local area network (LAN) cables, or may be wirelessly connected. In addition, other digital multifunction peripherals and servers may be connected within the network 25.

Figure 4:
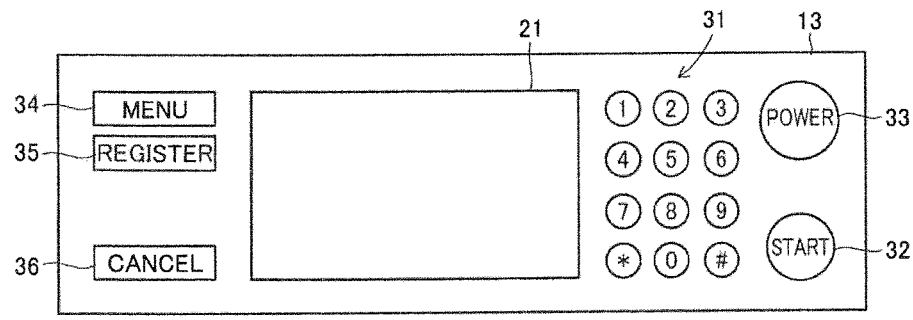
FIG. 4 is an external view schematically showing the configuration of an operation unit.

Next, the configuration of the aforementioned operation unit 13 will be further described in detail. FIG. 4 is an external view schematically showing the configuration of the operation unit 13. Referring to FIG. 4, the operation unit 13 includes numeric keys 31 including number keys 0 to 9 used to input the number of copies or the like and symbol keys like "*" and "#", a start key 32 used to start printing and sending a fax, a power key 33 used to turn on or off the power source of the digital multifunction peripheral 11, a menu key 34 used to select one of functions, such as a printer function and a copy function, of the digital multifunction peripheral 11, a register key 35 used to register various image forming conditions and users' information, a cancel key 36 used to cancel the instructions input by users with the numeric keys 31 and the other keys, and the aforementioned display screen 21. The display screen 21 is a liquid crystal display with a touch panel function that allows users to input image forming conditions and to select from among the functions by depressing the display screen 21 with their fingers.

Figure 5:
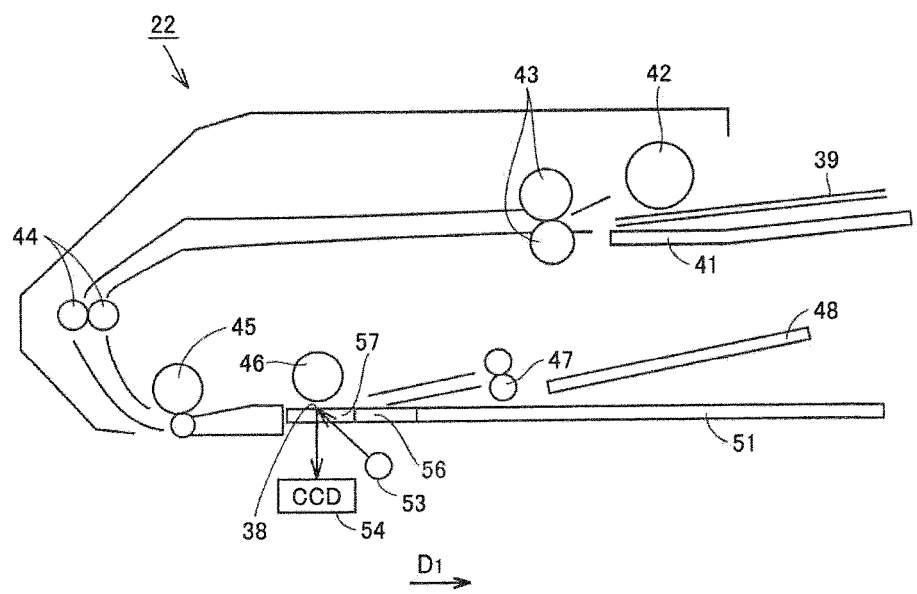
FIG. 5 is a schematic cross-sectional view partially showing an auto document feeder (ADF) included in an image reading unit.

Next, a description will be made about the configuration of the ADF 22 included in the image reading unit 14 of the digital multifunction peripheral 11 according to the embodiment of the disclosure. FIG. 5 is a schematic cross-sectional view partially showing the ADF 22 in the image reading unit 14. In order to provide a clear understanding, the document holder 40 is omitted in FIG. 5.

Referring to FIGS. 1 to 5, the ADF 22 includes a document loading table 41 on which a plurality of documents 39 to be transported are placed, a pickup roller 42 that successively feeds the documents 39 placed on the document loading table 41, a separation roller 43 that separates the documents 39 one from another, transport rollers 44, 45, 46 that transport the documents 39 to a reading position 38, a document output roller 47 that ejects the documents 39 read at the reading position 38, and a document output tray 48 onto which the documents 39 are ejected. When the documents are properly placed on the document loading table 41, it is said that the documents are loaded in the loading position of the ADF 22. FIG. 5 shows the sub-scanning direction with Arrow D1.

Figure 6:
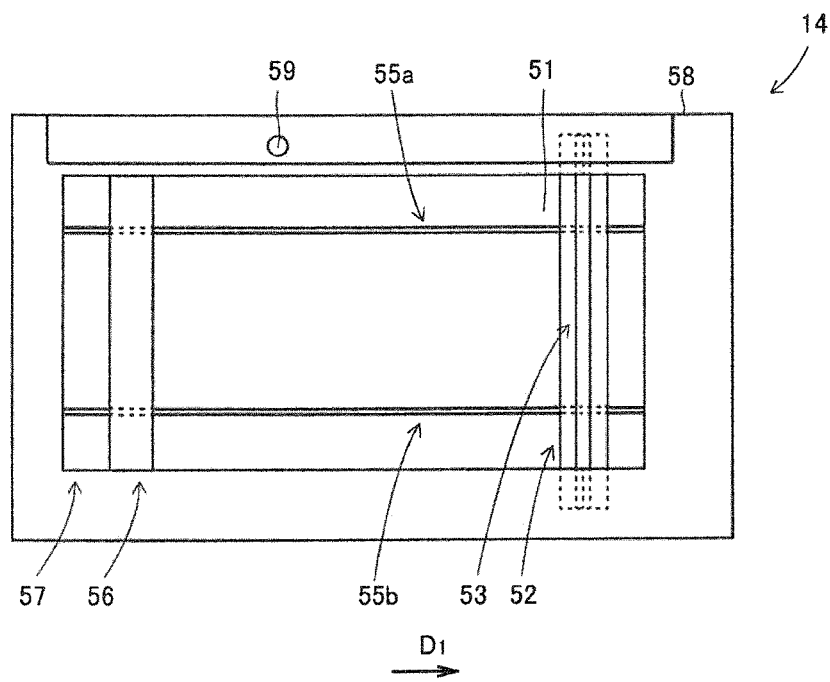
FIG. 6 is a schematic view of a document table as viewed from above.

Next, a brief description will be made about the configuration of the image reading unit 14 including the document table 51. FIG. 6 is a schematic view of the document table 51 as viewed from above. Referring to FIGS. 1 to 6, the image reading unit 14 includes a document table 51 on which a document with an image to be read is placed, and a carriage 52 that is movable in a sub-scanning direction indicated by Arrow D1 in FIG. 6 or the reverse direction and has a CCD sensor 54 that reads the reflected light from the document. The document table 51 is fitted in an opening of a housing 58 and is made of contact glass in this embodiment. The carriage 52 is guided by two guide rods 55a, 55b mounted in parallel with each other in the housing 58 and moves with power from a motor. The carriage 52 includes an exposure lamp 53 that emits light upwardly from below the document table 51, a plurality of mirrors, and a lens that collects and condenses the light. The exposure lamp 53 is made of a plurality of so-called light emitting diodes (LED) arranged in the main scanning direction. The carriage 52 moves in the sub-scanning direction while the exposure lamp 53 emits light toward the document table 51 to read the image of the document on the document table 51. The light is reflected off the document table 51, more specifically, the document placed on the document table 51. The reflected light is collected by the mirrors and lens and enters the CCD sensor 54, thus the image of the document on the document table 51 is captured. Alternatively, the carriage 52 is anchored at a glass plate 57 to read an image of a document fed by the ADF 22. The glass plate 57 is located next to a reference strip 56 in the sub-scanning direction and is composed of a transparent material. The reference strip 56 indicates a reference position referred to place a document on the document table 51. The image reading unit 14 can obtain color information of not only monochrome documents, but also color documents.

The document holder 40 integrally formed with the ADF 22 is attached to the housing 58 with a pair of hinges 49a, 49b. Closed the document holder 40 after a document is placed on the document table 51 holds the document. The image reading unit 14 includes a document-holder open/close detecting unit 59 (also referred to as a "document-holder position detector") that detects that the document holder 40 is opened. The back face 50 of the document holder 40, which faces the document table 51 when the document holder 40 is closed, is white. If the image reading unit 14 performs image reading operation when there is nothing on the document table 51, a white solid image of the back face 50 of the document holder 40 is captured.

If the start key 32 of the operation unit 13 is detected as being depressed while the document holder 40 is closed and the presence of a plurality of documents 39 has been detected by the loaded-document detecting unit 37a, the ADF 22 starts transporting the documents 39 successively to the reading position 38. Images of the documents 39 are successively read by the CCD sensor 54 in the reading position 38. The documents 39 read by the CCD are successively ejected onto the document output tray 48. Reading an image of a document 39 placed on the document table 51 is also performed upon detection of depression of the start key 32.

Figure 7:
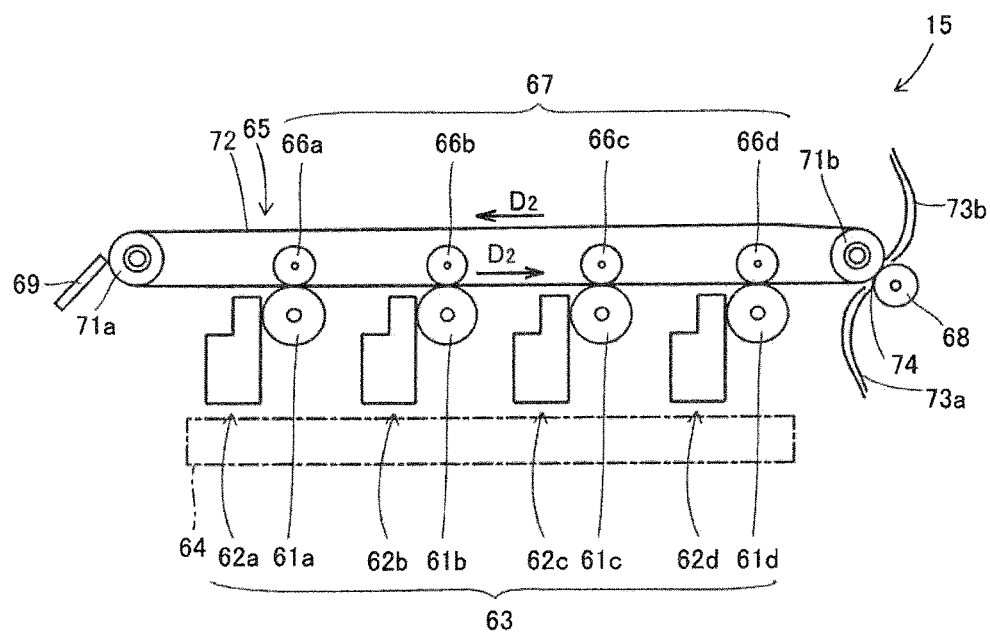
FIG. 7 is an external view schematically showing the configuration of an image forming unit.

A detailed description will be made about the configuration of the image forming unit 15 built in the digital multifunction peripheral 11. FIG. 7 is a schematic cross-sectional view showing a simple configuration of the image forming unit 15 in the digital multifunction peripheral 11. In order to provide a clear understanding, hatch patterns are removed from the components in FIG. 7. The cross-sectional view in FIG. 7 is taken along a vertical plane of the digital multifunction peripheral 11.

Referring to FIGS. 1 to 7, the image forming unit 15 includes a developing device 63, a laser scanner unit (LSU) 64, a transfer belt 65 serving as an intermediate transfer unit, a primary transfer unit 67 including four primary transfer rollers 66a, 66b, 66c, 66d, a secondary transfer roller 68, and a cleaning blade 69. The LSU 64 is schematically shown by a dot-and-dash line. The image forming unit 15 employed by the digital multifunction peripheral 11 is a so-called tandem process system using four colors.

The developing device 63 includes four photoreceptors 61a, 61b, 61c, 61d and four developing units 62a, 62b, 62c, 62d associated with four colors: yellow, magenta, cyan, and black, respectively. FIG. 7 depicts the developing units 62a to 62d in a schematic manner.

The LSU 64 exposes the four photoreceptors 61a to 61d with light based on an image read by the image reading unit 14. An electrostatic latent image is formed on each of the photoreceptors 61a to 61d based on the respective color components of the exposure light. The developing units 62a to 62d supply toner of different colors to the electrostatic latent images formed on the photoreceptors 61a to 61d, respectively. The toner is agitated in the developing units 62a to 62d to be charged, for example, positively. The charged toner is supplied onto the photoreceptors 61a to 61d to form toner images on the photoreceptors 61a to 61d. The visible toner images formed on the photoreceptors 61a to 61d are primarily transferred onto the transfer belt 65.

The transfer belt 65 has no end. The transfer belt 65 is rotated unidirectionally by a driving roller 71a and a driven roller 71b. The rotational direction of the transfer belt 65 is indicated by Arrow D2 in FIG. 7. Specifically, the transfer belt 65 rotates from the left to the right as viewed from its lower side where the photoreceptors 61a to 61d are disposed, but rotates from the right to the left as viewed from its upper side. Of the developing units 62a to 62d, the developing unit 62a is a yellow developing unit that is disposed on the most upstream side along the rotational direction of the transfer belt 65, while the developing unit 62d is a black developing unit that is disposed on the most downstream side. The transfer belt 65 rotates from the upstream side to the downstream side.

The four primary transfer rollers 66a to 66d are disposed opposite to the photoreceptors 61a to 61d, respectively, with respect to the transfer belt 65. The primary transfer unit 67 primarily transfers visible toner images of four different colors: yellow, magenta, cyan, and black, which are formed by the developing units 62a to 62d, onto the transfer belt 65. Specifically, the visible toner images, which are formed on the photoreceptors 61a to 61d by the developing units 62a to 62d, are primarily transferred onto a surface 72 of the transfer belt 65 by applying a bias to each of the primary transfer rollers 66a to 66d. During the primary transfer, the images of different colors are superimposed on the transfer belt 65 to form a full-color image on the transfer belt 65.

The secondary transfer roller 68 and the driven roller 71b are disposed opposite to each other with respect to the transfer belt 65. The image forming unit 15 includes a paper transport path 73a extending to a position 74 where the secondary transfer roller 68 abuts against the surface 72 of the transfer belt 65. Paper sheet, or a recording medium, passes through the paper transport path 73a. The image forming unit 15 also includes a paper transport path 73b through which paper sheet that has received an image in a secondary transfer process is transported toward a fuser unit. The paper sheet is supplied by the paper transporting unit 20 to the position 74 where the secondary transfer roller 68 abuts against the surface 72 of the transfer belt 65 through the paper transport path 73a positioned on the upstream side where the paper feed cassettes 23a to 23c are disposed. In synchronization with the time at which the paper sheet is transported to the position 74, a bias of the opposite polarity to the toner is applied to the secondary transfer roller 68. With the application of the bias to the secondary transfer roller 68, the visible toner image formed on the surface 72 of the transfer belt 65 is electrically attracted toward the paper sheet supplied, thereby being secondarily transferred onto the paper sheet. The paper sheet on which the visible toner image has been transferred is transported through the paper transport path 73b to the fuser unit.

The cleaning blade 69 is disposed opposite to the driving roller 71a with respect to the transfer belt 65. The cleaning blade 69 is disposed upstream of the yellow developing unit 62a. The cleaning blade 69 is a long thin rubber-like plate member with elasticity. The cleaning blade 69 is attached so that its longitudinal direction is oriented along the main scanning direction of the digital multifunction peripheral 11. The top end of the cleaning blade 69 abuts against the surface 72 of the transfer belt 65 in a so-called counter direction. The cleaning blade 69, secured at a specified place, physically removes toner adhering to the surface 72 of the unidirectionally rotating transfer belt 65. The material of the cleaning blade 69 may be, for example, polyurethane rubber. After the visible toner image is transferred onto a paper sheet paper, residual toner on the transfer belt 65 is physically removed by the cleaning blade 69. Subsequently, the next image forming operation is performed.

The digital multifunction peripheral 11 has a capability of performing monochrome printing by using only the black developing unit 62d. Similarly, the digital multifunction peripheral 11 can perform color printing by using at least one of the yellow developing unit 62a, magenta developing unit 62b, and cyan developing unit 62c.

The digital multifunction peripheral 11 can form images in either of two modes: a first mode in which the paper transporting unit 20 starts transporting paper when the image reading unit 14 starts reading an image; and a second mode in which the paper transporting unit 20 starts transporting paper after the image reading unit 14 finishes reading an image.

The first mode is a so-called fast copy mode that can increase the output speed. The first mode allows the image forming unit 15 that has just finished forming an image to form a subsequent image on a paper sheet without waiting for the paper sheet to be supplied. If the first mode is selected, the paper transporting unit 20 starts transporting a paper sheet loaded in the paper loading unit 19 at the moment when the image reading unit 14 reads an image, and holds the paper sheet on standby before the position 74. Then, the paper sheet is moved in synchronization with the movement of the image formed on the surface 72 of the transfer belt 65, and the image is immediately transferred onto the paper sheet by the secondary transfer roller 68, thereby forming the image on the paper sheet.

The second mode is a so-called normal mode in which paper transportation starts after the image reading unit 14 finishes reading an image. If the digital multifunction peripheral 11 is in the second mode, the paper transporting unit 20 starts transporting paper sheet loaded in the paper loading unit 19 after the image reading unit 14 finishes reading the image, and holds the paper sheet on standby before the position 74. Then, the paper sheet is moved in synchronization with the movement of the image formed on the surface 72 of the transfer belt 65, thereby forming the image on the paper sheet.

The digital multifunction peripheral 11 is set to the first mode as the default setting. The controller 12 includes a mode selection unit (also referred to as a "mode selector") used to select at least one of the first mode and second mode.

Figure 8:
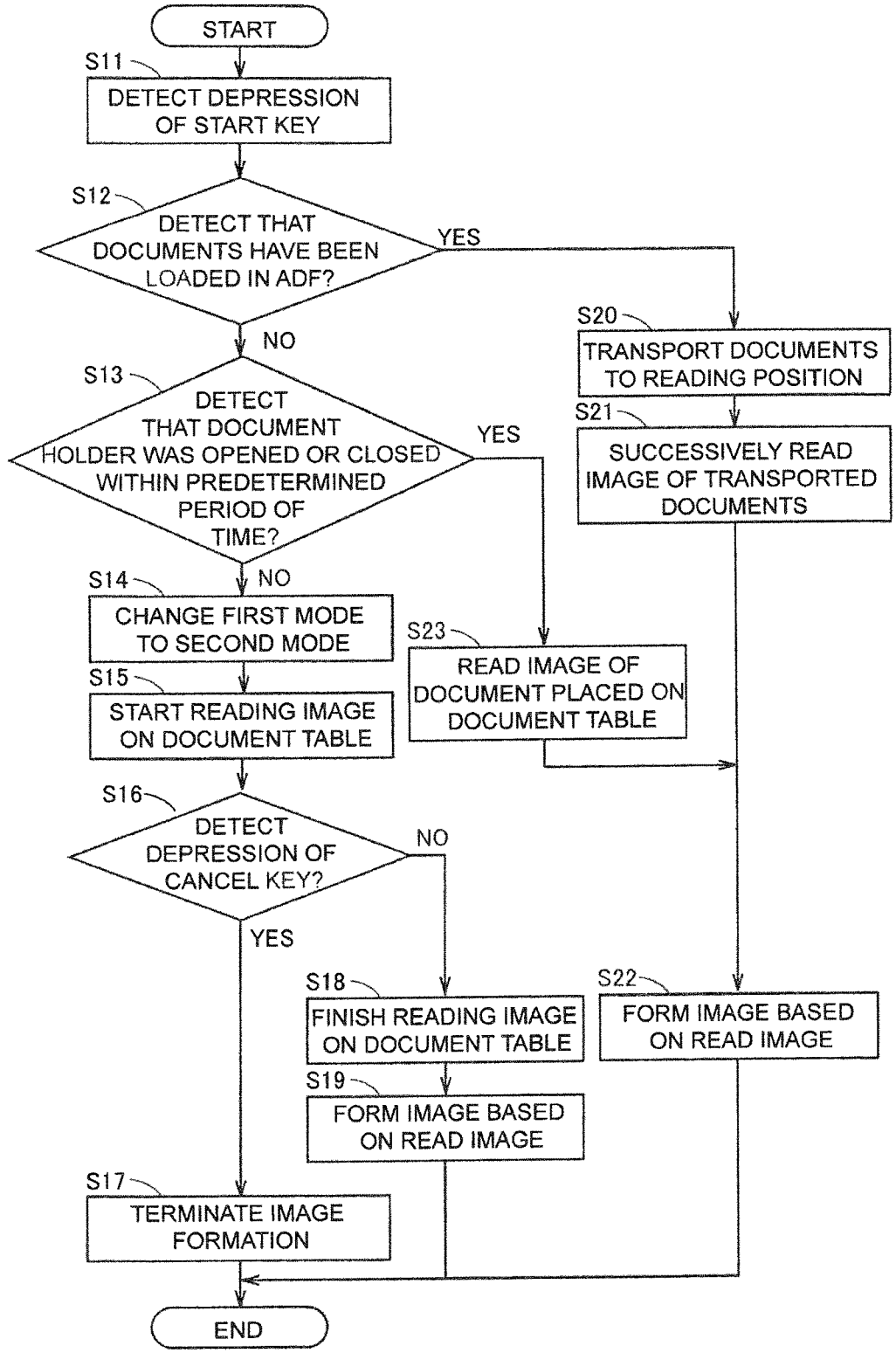
FIG. 8 is a flowchart showing processing details about how the digital multifunction peripheral operates when a start key is depressed even though documents have not been properly loaded in a loading position of the ADF.

A description will be made about how the digital multi-function peripheral 11 according to the embodiment of the disclosure operates in a case where the start key 32 is depressed even though documents 39 have not been properly loaded in the loading position of the ADF 22. FIG. 8 is a flowchart showing processing details when the start key 32 is depressed even though documents 39 have not been properly loaded in the loading position of the ADF 22.

Referring to FIG. 8, a user depresses the start key 32 in the belief that the user has loaded the documents 39 in the loading position on the document loading table 41 of the ADF 22. In this case, the documents 39 loaded by the user are not actually loaded in the loading position in a proper way, for example, the documents 39 may be skewed with respect to the document loading table 41.

The digital multifunction peripheral 11 detects the depression of the start key 32, and accepts an image formation request (in step S11 in FIG. 8, hereinafter "step" is omitted). In this step, the operation unit 13 or the like operate as an acceptance unit (also referred to as an "acceptor"). At this point, settings for images to be formed are input through the display screen 21, numeric keypad 31, and other components of the operation unit 13. Thus, the operation unit 13 or the like also operate as a setting input unit (also referred to as an "input setter") through which the settings for images to be formed by the image forming unit 15 are input.

Next, the digital multifunction peripheral 11 detects whether the documents 39 have been loaded in the loading position of the ADF 22 (S12). In this case, the loaded-document detecting unit 37a is used to detect whether the documents 39 are placed on the document loading table 41.

If the loaded-document detecting unit 37a does not detect that the documents 39 have been loaded in the loading position or detects that the documents 39 have not been properly loaded in the loading position or other improper situations (NO in S12), the digital multifunction peripheral 11 then detects whether a document 39 has been placed on the document table 51. This detection is made by detecting whether the document holder 40 was opened within a predetermined period of time (S13). Specifically, the document-holder open/close detecting unit 59 included in the placed-document detecting unit 37b detects whether the document holder 40 was opened within the predetermined period of time. The predetermined period of time in this embodiment is set to start from the last image formation until the depression of the start key 32. The time at which the last image was formed is stored, for example, in the hard disk 16 so as to be retained in the digital multifunction peripheral 11.

If the document-holder open/close detecting unit 59 does not detect that the document holder 40 was opened within the predetermined period of time (NO in S13), the digital multifunction peripheral 11 detects that the document 39 has not been placed on the document table 51. This detection is based on the idea that it is physically impossible to place the document 39 on the document table 51 if the document holder 40 was not opened or closed for a predetermined period of time.

In response to the detection, the first mode is changed to the second mode (S14). Specifically, the mode is changed from the fast copy mode in which a paper sheet is transported when the image reading unit 14 starts reading operation to the normal mode in which a paper sheet is transported after the image reading unit 14 finishes reading operation. In S14, the controller 12 operates as a mode selection unit. The transition to the second mode is made at the start of the image reading operation by the image reading unit 14.

Then, the image reading unit 14 reads an image on the document table 51 (S15). Specifically, the image reading unit 14 reads the image on the document table 51 by emitting light to the image from the exposure lamp 53 while moving the carriage 52 in the direction of Arrow D1, which is so-called scanning.

When the image on the document table 51 is being read, the user notices that the image on the document table 51 is being read even though the user has placed the documents 39 on the document loading table 41. Then, the user recognizes that the documents 39 are in an improper condition on the document loading table 41.

The user depresses a cancel key 36 to abort image formation. The digital multifunction peripheral 11 detects the depression of the cancel key 36 (YES in S16), and terminates the image forming operation (S17). Since the digital multifunction peripheral 11 is in the second mode, the image forming operation is terminated before a paper sheet is transported.

According to the digital multifunction peripheral 11, upon acceptance of an image forming request, if the loaded-document detecting unit 37a detects that documents 39 have not been loaded in the loading position and the placed-document detecting unit 37b detects that a document 39 has not been placed on the document table 51, the mode is changed to the second mode and the image reading unit 14 reads an image on the document table 51. This can prevent, as much as possible, a paper sheet from reaching the image forming unit 15 when the user notices that the documents 39 have not been loaded in the loading position of the ADF 22 due to a user's mistake or other reasons, and depresses the cancel key 36 to abort image formation. Thus, the digital multifunction peripheral 11 can reduce the risk of wasting paper sheets.

The placed-document detecting unit 37b detects the document 39 has not been placed on the document table 51 if the document-holder open/close detecting unit 59 does not detect that the document holder 40 was opened, and therefore the digital multifunction peripheral 11 can detect whether the document 39 has been placed on the document table 51, for example, without moving the carriage 52.

If the user does not notice that an image on the document table 51 is being read and depression of the cancel key 36 is not detected (NO in S16), the digital multifunction peripheral 11 forms an image based on the image read in the second mode, which is the normal mode (S18). In the second mode, a paper sheet is transported after the image reading operation is completed, undergoes image formation, and is output. In this case, since there is no document 39 on the document table 51, an image of the back face 50 of the document holder 40 is formed.

On the other hand, if the documents 39 have been loaded in the loading position of the ADF 22 in S12, the loaded-document detecting unit 37a detects the documents 39 have been loaded (YES in S12). With the detection of the documents 39, the ADF 22 successively transports the documents 39 to the reading position 38 (S19). The image reading unit 14 successively reads images of the transported documents 39 (S20). Images are formed based on the read images in the first mode, and then the image forming operation is completed (S21). A paper sheet with the images formed in the first mode, or the fast copy mode, can be output at an increased speed.

In S12, if the documents 39 have not been loaded in the loading position of the ADF 22 (NO in S12) and the document-holder open/close detecting unit 59 detects that the document holder 40 was opened (YES in S13), the placed-document detecting unit 37b detects that a document 39 has been placed in position on the document table 51. Then, an image of the document 39 placed on the document table 51 is read (S22). Specifically, the image reading unit 14 reads the image of the document 39 on the document table 51 by moving the carriage 52 in the sub-scanning direction. As with the case of the documents 39 loaded in the ADF 22, an image is formed in the first mode based on the read image, and the image forming operation is completed (S21). A paper sheet with the image formed in the first mode, or the fast copy mode, can be output at an increased speed.

In the above-described embodiment, the placed-document detecting unit 37b is configured to detect whether a document has been placed on the document table 51 based on the detection result from the document-holder open/close detecting unit 59 that detects whether the document holder 40 was opened or closed; however, the present disclosure is not limited thereto, and the placed-document detecting unit 37b can be configured to detect the absence of a document 39 on the document table 51 if the image on the document table 51 read by the image reading unit 14 is white.

The digital multifunction peripheral 11 in this embodiment can include a loaded-document presence/absence detecting unit that detects whether there are documents 39 on the ADF 22. In addition, the placed-document detecting unit 37b can be configured to detect that the document 39 has not been placed on the document table 51 if the loaded-document presence/absence detecting unit detects the presence of documents 39 on the ADF 22. Specifically, if the loaded-document presence/absence detecting unit detects that there are documents 39 at a specified point along the longitudinal direction of the documents 39 placed on the document loading table 41, the digital multifunction peripheral 11 detects that the document loading table 41 has a document 39 thereon, but the document table 51 has no document 39 thereon. Such configurations can reduce the risk of wasting paper sheets when documents 39 have been placed on the document loading table 41, but have not been properly placed in the loading position.

In the above-described embodiment, the predetermined period of time in which the document-holder open/close detecting unit 59 operates to detect the opening or closing of the document holder 40 is set to start from the last image formation until the depression of the start key 32; however, the present disclosure is not limited thereto, and for example, the predetermined period of time may be set so as to start a few minutes before the start key 32 is depressed until the depression of the start key 32. By setting the time as described above, detection derived from other users' behavior to merely open or close the ADF 22 can be excluded, and therefore the risk of wasting paper sheets can be further reduced.

In the above-described embodiment, the digital multifunction peripheral 11 is configured to form images in the first mode or second mode; however, the present disclosure is not limited thereto, and can further have a third mode for image formation. In the third mode, for example, if the document 39 is detected as not being placed on the document table 51, the digital multifunction peripheral 11 may read an image on the document table 51, display an icon of the reduced-size read image on the display screen, and wait for the next operation until the user makes a selection to print the image or cancel.

Figure 9:
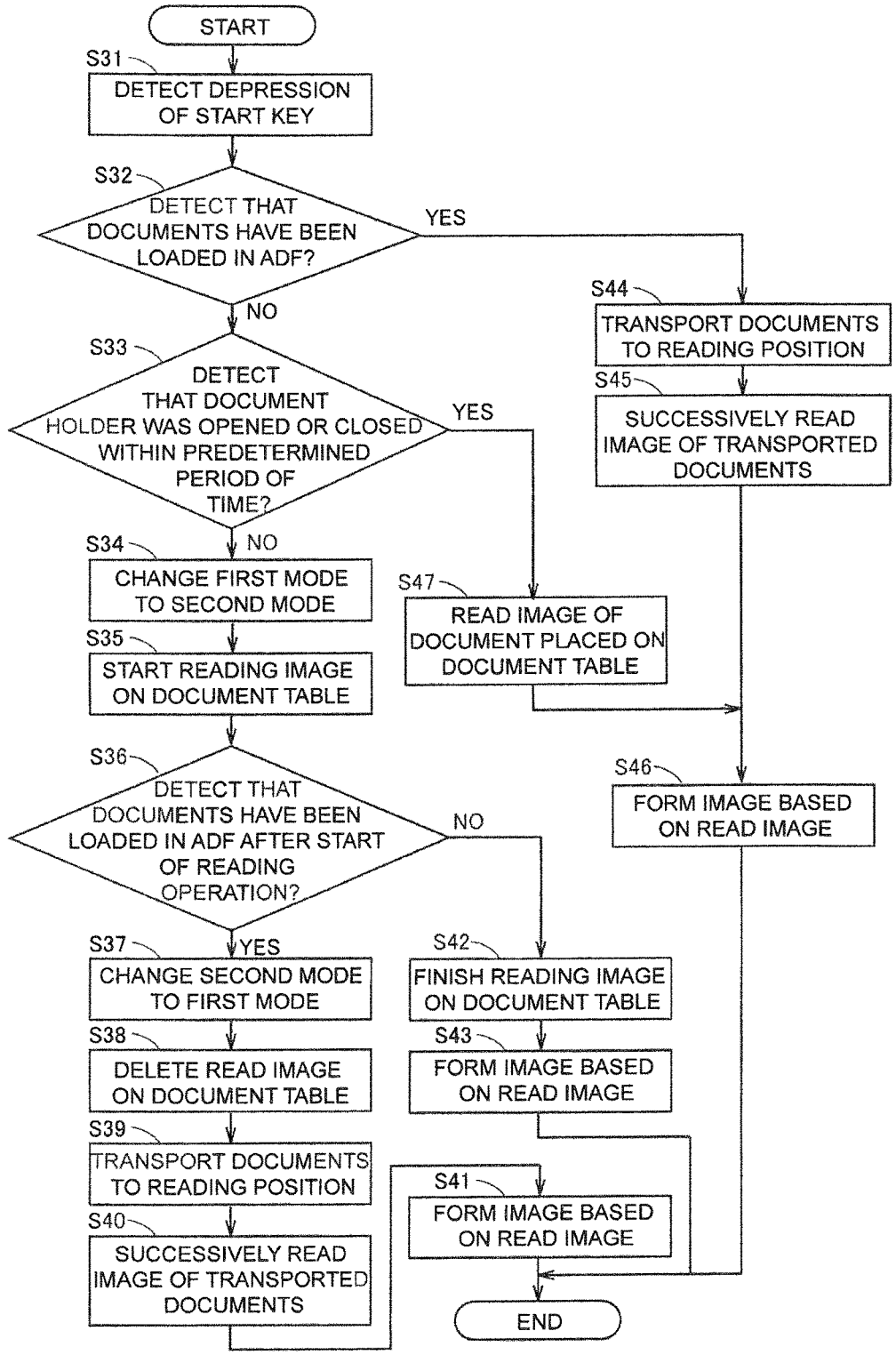
FIG. 9 is a flowchart showing processing details, according to another embodiment, about how the digital multifunction peripheral operates when a start key is depressed even though documents have not been properly loaded in the loading position of the ADF.

A description will be made about another embodiment with the digital multifunction peripheral 11. In this embodiment, the start key 32 is depressed even though documents 39 have not been properly loaded in a loading position of the ADF 22. FIG. 9 is a flowchart showing processing details according to the embodiment when the start key 32 is depressed even though documents 39 have not been properly loaded in a loading position of the ADF 22.

Referring to FIG. 9, a user depresses the start key 32 in the belief that the user has loaded the documents 39 in the loading position on the document loading table 41 of the ADF 22. In this case, the documents 39 loaded by the user are not actually loaded in the loading position in a proper way, for example, the documents 39 may be skewed with respect to the document loading table 41.

The digital multifunction peripheral 11 detects the depression of the start key 32 and accepts an image formation request (S31). In S31, the operation unit 13 or the like operate as an acceptance unit. At this point, settings for images to be formed are input through the display screen 21, numeric keypad 31, and other components of the operation unit 13. Thus, the operation unit 13 also operates as a setting input unit through which the settings for images to be formed by the image forming unit 15 are input.

Next, the digital multifunction peripheral 11 detects whether the documents 39 are loaded in the loading position of the ADF 22 (S32). This detection is made by the loaded-document detecting unit 37a that detects whether the documents 39 are placed on the document loading table 41.

If the loaded-document detecting unit 37a does not detect that the documents 39 have been loaded in the loading position or detects that the documents 39 have not been properly loaded in the loading position or other improper situations (NO in S32), the digital multifunction peripheral 11 then detects whether a document 39 is placed on the document table 51. This detection is made by detecting whether the document holder 40 was opened within a predetermined period of time (S33). Specifically, the document-holder open/close detecting unit 59 included in the placed-document detecting unit 37b detects whether the document holder 40 was opened within the predetermined period of time. The predetermined period of time in this embodiment is set to start from the last image formation until the depression of the start key 32. The time at which the last image was formed is stored, for example, in the hard disk 16 so as to be retained in the digital multifunction peripheral 11.

If the document-holder open/close detecting unit 59 does not detect that the document holder 40 was opened within the predetermined period of time (NO in S33), the digital multifunction peripheral 11 detects that the document 39 has not been placed on the document table 51. This detection is based on the idea that it is physically impossible to place the document 39 on the document table 51 if the document holder 40 was not opened or closed for a predetermined period of time.

In response to the detection, the first mode is changed to the second mode (S34). Specifically, the mode is changed from the fast copy mode in which a paper sheet is transported when the image reading unit 14 starts reading operation to the normal mode in which a paper sheet is transported after the image reading unit 14 finishes reading operation. In S14, the controller 12 operates as a mode selection unit. The transition to the second mode is made at the start of the image reading operation by the image reading unit 14.

Then, the image reading unit 14 reads an image on the document table 51 (S35). Specifically, the image reading unit 14 reads the image on the document table 51 by emitting light to the image from the exposure lamp 53 while moving the carriage 52 in the direction of Arrow D1, which is so-called scanning.

In short, when the acceptance unit accepts the image formation request, if the loaded-document detecting unit 37a detects that the documents 39 have not been loaded in the loading position and the document-holder open/close detecting unit 59 detects that the document holder 40 was not opened within the predetermined period of time, the controller 12, serving as a first control unit (also referred to as a "first controller"), controls the mode selection unit to select the second mode and controls the image reading unit 14 to read the image on the document table 51.

When the image on the document table 51 is being read, the user notices that the image on the document table 51 is being read even though the user has placed the documents 39 on the document loading table 41. Then, the user recognizes that the documents 39 are in an improper state on the document loading table 41.

The user reloads the documents 39 in a proper loading position of the ADF 22. If the user properly places the documents 39 on the document loading table 41, the loaded-document detecting unit 37a detects that the documents 39 have been placed on the document loading table 41 (YES in S36).

Once the documents 39 are detected as being loaded, the second mode is changed to the first mode (S37). Then, the digital multifunction peripheral 11 tries to form images of the documents 39 reloaded in the ADF 22.

Specifically, the image on the document table 51 that has been read so far is deleted (S38). Then, the documents 39 properly placed on the document loading table 41 are transported to the reading position 38 (S39). Subsequently, the images of the documents 39 are successively read (S40), and images are formed based on the read images (S41). In this case, the image forming unit 15 forms the images in accordance with the image settings input through the operation unit 13, serving as a setting input unit, based on the document images read by the image reading unit 14.

If the loaded-document detecting unit 37a detects that documents 39 have been loaded in the loading position while the first control unit is in operation, the controller 12, which serves as a second control unit (also referred to as a "second controller"), controls the ADF 22 to transport the documents 39 loaded in the loading position to the reading position 38 while controlling the mode selection unit to select the first mode, and controls the image forming unit 15 to form images based on the images of the documents 39 transported by the ADF 22 and read by the image reading unit 14.

If the loaded-document detecting unit 37a does not detect that the documents 39 have been reloaded in the ADF 22 (NO in S36), the image reading unit 14 finishes reading the image on the document table 51 (S42), and an image is formed based on the read image (S43). Since the second mode is selected, a paper sheet is transported after the image reading operation is terminated, and an image is formed on the transported a paper sheet that is in turn output. In this case, since there is no document 39 on the document table 51, an image of the back face 50 of the document holder 40 is formed.

According to the digital multifunction peripheral 11, if, upon acceptance of an image formation request, the loaded-document detecting unit 37a detects that the documents 39 have not been loaded in the loading position and the document-holder open/close detecting unit 59 detects that the document holder 40 was not opened within the predetermined period of time, the mode selection unit selects the second mode and an image on the document table 51 is read. If, in the middle of reading the image on the document table 51, the loaded-document detecting unit 37a detects that the documents 39 have been loaded in the loading position, the ADF 22 transports the documents 39 in the loading position to the reading position 38 and the mode is changed to the first mode. Then, the image reading unit 14 reads the images of the transported documents 39, and the image forming unit 15 forms images based on the read images. This configuration has the following advantage: when a user recognizes that an image on the document table 51 is being read due to a user's unintentional loading error of the documents 39, and then reloads the documents 39 in the ADF 22 in a proper manner, images are formed based on the images of the properly reloaded documents 39. As the documents 39 are properly loaded, the digital multifunction peripheral 11 enters the first mode to form the images, thereby increasing the output speed. Forming images based on the images of the reloaded documents 39 does not require the user to depress the start key 32 again, thereby enhancing a user's workability. In addition, reading the image on the document table 51 in the second mode grants the user some time to cancel the print job. Furthermore, the digital multifunction peripheral 11 is configured to enter the second mode when the placed-document detecting unit 37b detects that the document 39 has not been placed on the document table 51 and the document-holder open/close detecting unit 59 detects that the document holder 40 was not opened within a predetermined period of time. This configuration can prevent, as much as possible, a paper sheet from reaching the image forming unit 15 when the user notices that the documents 39 have not been loaded in the loading position of the ADF 22 due to a user's mistake and depresses the cancel key 36 to abort image formation. Thus, the digital multifunction peripheral 11 can reduce the risk of wasting paper sheets and also can reduce the possibility of making a user's operations complicated.

In this case, the image forming unit 15 forms images in accordance with the image settings input through the operation unit 13, which serves as a setting input unit, based on the document images read by the image reading unit 14, thereby eliminating reentry of the image settings and therefore saving a user's time and labor.

On the other hand, if the documents 39 have been loaded in the loading position of the ADF 22 in S32, the loaded-document detecting unit 37a detects the presence of the documents 39 (YES in S32). With the detection of the documents 39, the ADF 22 successively transports the documents 39 to the reading position 38 (S44). The image reading unit 14 successively reads the images of the transported documents 39 (S45). Images are formed based on the read images in the first mode, and the image forming operation is completed (S46). A paper sheet with the images formed in the first mode, or the fast copy mode, can be output at an increased speed.

In S32, if the documents 39 have not been loaded in the loading position of the ADF 22 (NO in S32) and the document-holder open/close detecting unit 59 detects that the document holder 40 was opened (YES in S33), the placed-document detecting unit 37b detects that a document 39 has been placed in position on the document table 51. Then, an image of the document 39 on the document table 51 is read (S47). Specifically, the image reading unit 14 reads the image of the document 39 on the document table 51 by moving the carriage 52 in the sub-scanning direction. As with the case of the documents 39 loaded in the ADF 22, an image is formed in the first mode based on the read image, and the image forming operation is completed (S46). A paper sheet with the image formed in the first mode, or the fast copy mode, can be output at an increased speed.

In this embodiment, the predetermined period of time in which the document-holder open/close detecting unit 59 operates to detect the opening or closing of the document holder 40 is set to start from the last image formation until the depression of the start key 32; however, the present disclosure is not limited thereto, and for example, the predetermined period of time may be set so as to start a few minutes before the start key 32 is depressed until the depression of the start key 32. By setting the time as described above, detection derived from other users' behavior to merely open or close the ADF 22 can be excluded, and therefore the risk of wasting paper sheets can be further reduced.

Although the second control unit controls the image reading unit 14 to abort reading an image on the document table 51 to read the images of the documents transported by the ADF 22 in this embodiment, the present disclosure is not limited thereto, and the second control unit can be configured to control the image reading unit 14 to read the images of the documents transported by the ADF 22 after finishing reading the image on the document table 51.

Although the acceptance unit includes the setting input unit through which settings for images to be formed by the image forming unit 15 are input and the second control unit controls the image forming unit 15 to form images in accordance with the image settings input through the setting input unit based on the document image read by the image reading unit 14 in this embodiment, the present disclosure is not limited thereto, and the acceptance unit can be configured to require the user to reenter the image settings through the setting input unit.

In addition, the first control unit can be configured to include a determination unit (also referred to as a "determiner") that determines whether the image on the document table 51 read by the image reading unit 14 is a white image, and the second control unit can be configured to operate when the determination unit determines that the image on the document table 51 is a white image. These configurations can exclude a case where a user opens the document holder 40 and places a document on the document table 51 before the digital multifunction peripheral 11 is activated and some similar cases.

Although the digital multifunction peripheral 11 in this embodiment is configured to form images in the first mode or second mode, the present invention is not limited thereto, and the digital multifunction peripheral 11 can be configured to form images still in the aforementioned third mode when the document 39 is detected as not being placed on the document table 51.

Figure 10:
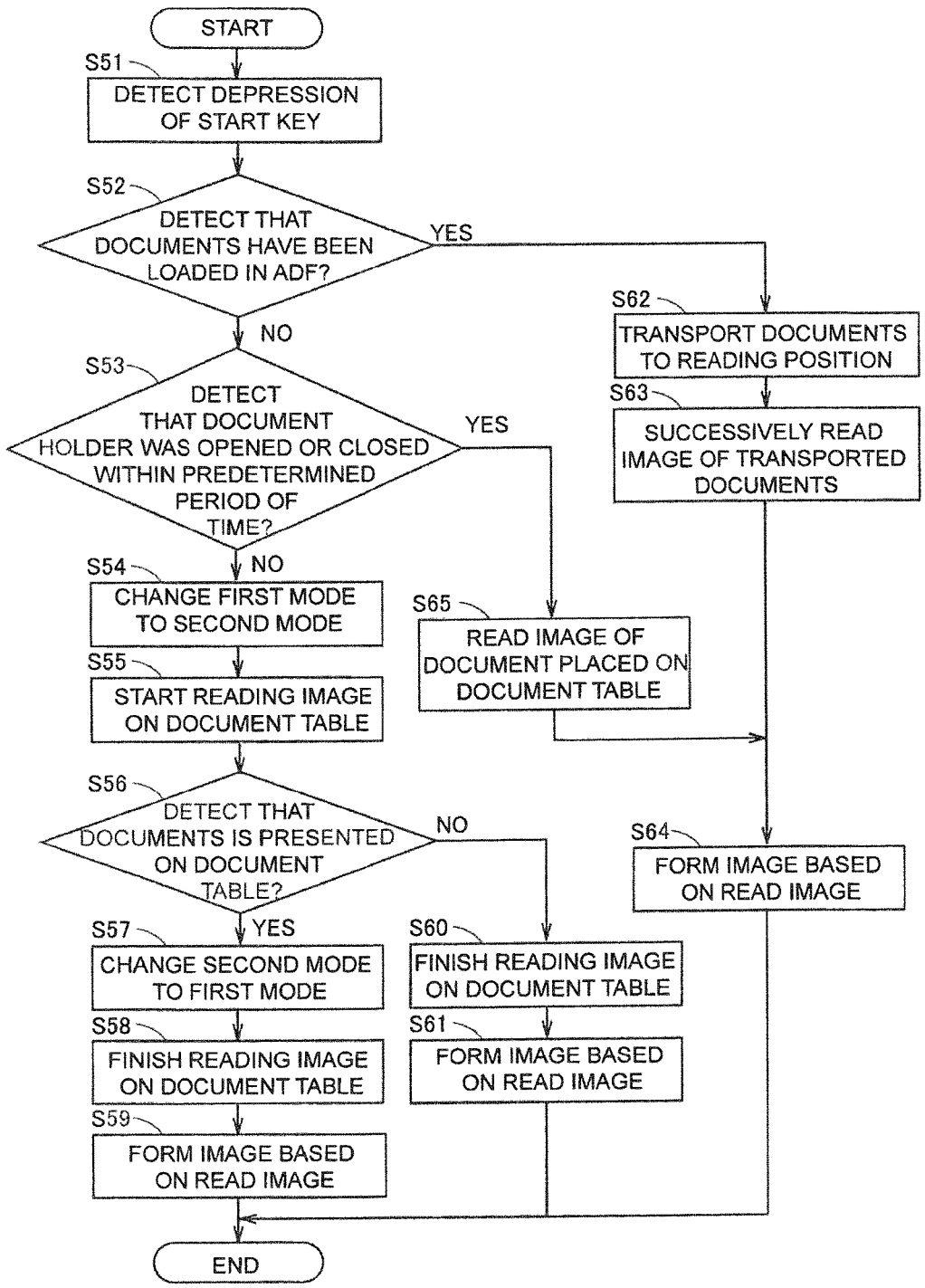
FIG. 10 is a flowchart showing processing details about how the digital multifunction peripheral operates when a start key is depressed even though a document has been left behind on the document table and documents have not been properly loaded in the loading position of the ADF.

A description will be made about how the digital multifunction peripheral 11 operates in a case where the start key 32 is depressed while a document has been forgotten to be removed from the document table 51 and documents 39 have not been properly loaded in the loading position of the ADF 22. FIG. 10 is a flowchart showing processing details when the start key 32 is depressed while a document has been left behind on the document table 51 and documents 39 have not been properly loaded in the loading position of the ADF 22.

Referring to FIG. 10, a user depresses the start key 32 in the belief that the user has loaded documents 39 in the loading position on the document loading table 41 of the ADF 22. In this case, the documents 39 loaded by the user are not actually loaded in the loading position in a proper way, for example, the documents 39 may be skewed with respect to the document loading table 41.

The digital multifunction peripheral 11 detects the depression of the start key 32 and accepts an image formation request (S51). In S51, the operation unit 13 or the like operate as an acceptance unit. At this point, settings for images to be formed are input through the display screen 21, numeric keypad 31, and other components of the operation unit 13. Thus, the operation unit 13 also operates as a setting input unit through which the settings for images to be formed by the image forming unit 15 are input.

Next, the digital multifunction peripheral 11 detects whether the documents 39 have been loaded in the loading position of the ADF 22 (S52). This detection is made by the loaded-document detecting unit 37a that detects whether the documents 39 have been placed on the document loading table 41.

If the loaded-document detecting unit 37a does not detect that the documents 39 have been loaded in the loading position or detects that the documents 39 have not been properly placed in the loading position or other improper situations (NO in S52), the digital multifunction peripheral 11 then detects whether a document has been placed on the document table 51. This detection is made by detecting whether the document holder 40 was opened within a predetermined period of time (S53). Specifically, the document-holder open/close detecting unit 59 included in the placed-document detecting unit 37b detects whether the document holder 40 was opened within the predetermined period of time. The predetermined period of time in this embodiment is set to start from the last image formation until the depression of the start key 32. The information about the time at which the last image was formed is stored, for example, in the hard disk 16 so as to be retained in the digital multifunction peripheral 11.

If the document-holder open/close detecting unit 59 does not detect that the document holder 40 was opened within the predetermined period of time (NO in S53), the digital multifunction peripheral 11 detects that the document 39 has not been placed on the document table 51. This detection is based on the idea that it is physically impossible to place the document 39 on the document table 51 if the document holder 40 was not opened or closed for the predetermined period of time.

In response to the detection, the first mode is changed to the second mode (S54). Specifically, the mode is changed from the fast copy mode in which paper is transported when the image reading unit 14 starts reading an image to the normal mode in which paper is transported after the image reading unit 14 finishes reading an image. In S14, the controller 12 operates as a mode selection unit. The transition to the second mode is made at the start of an image reading operation by the image reading unit 14.

Then, the image reading unit 14 reads an image on the document table 51 (S55). Specifically, the image reading unit 14 reads the image on the document table 51 by emitting light to the image from the exposure lamp 53 while moving the carriage 52 in the direction of Arrow D1, which is so-called scanning.

In short, when the acceptance unit accepts an image formation request, if the loaded-document detecting unit 37a detects that the documents 39 have not been loaded in the loading position and the document-holder open/close detecting unit 59 detects that the document holder 40 was not opened within the predetermined period of time, the controller 12, serving as a third control unit, controls the mode selection unit to select the second mode and controls the image reading unit 14 to read the image on the document table 51.

If, for example, a user opens the document holder 40 and places a document 39 on the document table 51 upon startup of the digital multifunction peripheral 11, but forgets to form an image of the placed document 39 and leaves it behind, the digital multifunction peripheral 11 detects that there is an image on the document table 51 when reading the image on the document table 51 (YES in S56).

Figure 11:
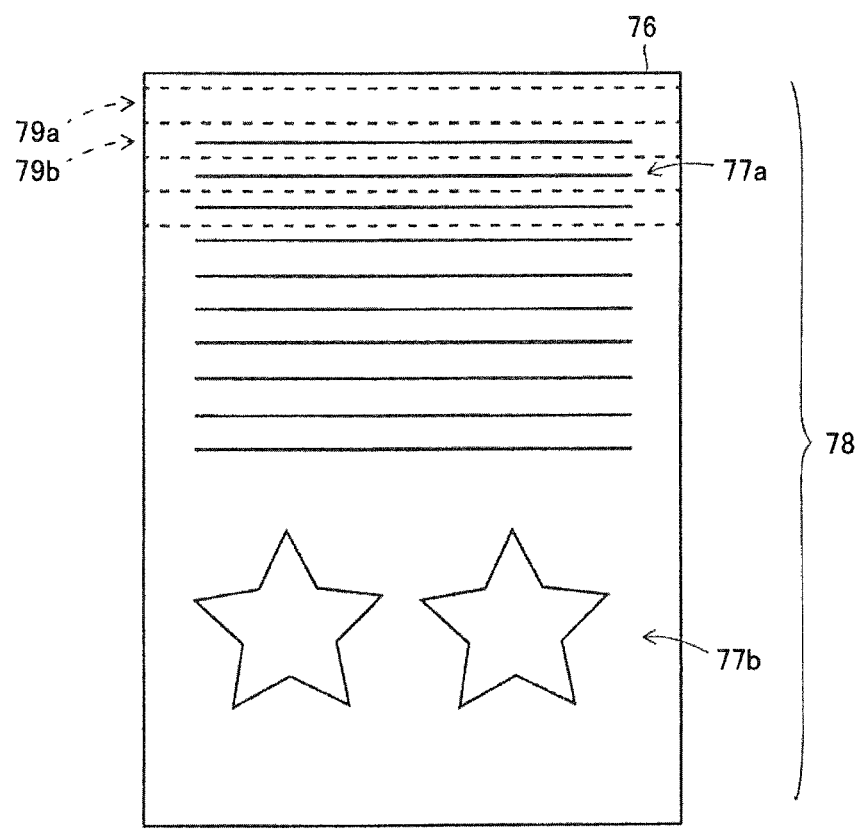
FIG. 11 illustrates an example document left behind on the document table.

FIG. 11 illustrates an example document left behind on the document table 51. Referring to FIG. 11, a document 76 has an image 78 composed of a text part 77a with letters written horizontally in an upper half of the image 78, and a picture part 77b with two star patterns drawn in a lower half of the image 78. Assume that the document 76 has been placed without the aforementioned predetermined period of time. The image reading unit 14 reads the image 78 line by line from a line 79a to a line 79b. The captured image on the line 79a is a white image, but the captured image on the line 79b is a white and black image. Capturing the image of a color other than white makes the digital multifunction peripheral 11 detect that there is the image 78 on the document table 51.

In response to the detection, the first mode is changed to the second mode (S57). Subsequently, the image reading unit 14 continuously reads the image on the document table 51, that is, the image 78 of the document 76. After the image 78 is completely read (S58), an image is formed based on the read image 78 (S59). In this case, image formation means copying, and therefore a copy of the image 78 is made on a sheet of paper and is output.

In short, if an image is detected as being present on the document table 51 while the image reading unit 14 is reading the image on the document table 51, the controller 12, serving as a fourth control unit, controls the mode selection unit to select the first mode and controls the image forming unit 15 to form an image based on the image read by the image reading unit 14.

If an image is not detected as being present on the document table 51 (NO in S56), the image reading unit 14 finishes reading the image on the document table 51 (S60), and an image is formed based on the read image (S61). Since the second mode is selected, a paper sheet is transported after the image reading operation is terminated, and an image is formed on the transported paper sheet that is in turn output. In this case, since there is no document 39 on the document table 51, an image of the back face 50 of the document holder 40 is formed.

According to the digital multifunction peripheral 11, upon acceptance of an image formation request, if the loaded-document detecting unit 37a detects that the documents 39 have not been loaded in the loading position and the document-holder open/close detecting unit 59 detects that the document holder 40 was not opened within the predetermined period of time, the mode is changed to the second mode and the image reading unit 14 reads the image on the document table 51. Then, if an image is detected as being present on the document table 51 during the reading operation of the image on the document table 51, the mode is changed to the first mode, and an image is formed based on the read image. According to this configuration, if a document 39 is placed on the document table 51 while the document-holder open/close detecting unit 59 is not in operation, for example, because the digital multifunction peripheral 11 is in the middle of the startup operation, but the document 39 is left behind without being subjected to image formation, the digital multifunction peripheral 11 can recognize the image of the document 39 and form an image based on the image of the document 39. In this case, the image is formed in the first mode, thereby increasing the output speed. The digital multifunction peripheral 11 is configured to enter the second mode when the placed-document detecting unit 37b detects that the document 39 has not been placed on the document table 51 and the document-holder open/close detecting unit 59 detects that the document holder 40 was not opened within the predetermined period of time. This configuration can prevent, as much as possible, a paper sheet from reaching the image forming unit 15 when the user notices that the documents 39 have not been loaded in the loading position of the ADF 22 due to a user's mistake and depresses the cancel key 36 to abort image formation. Thus, the digital multifunction peripheral 11 can reduce the risk of wasting paper sheets and also can form an image of the document 39 left behind on the document table 51.

On the other hand, if the documents 39 have been loaded in the loading position of the ADF 22 in S52, the loaded-document detecting unit 37a detects the presence of the documents 39 (YES in S52). With the detection of the documents 39, the ADF 22 successively transports the documents 76 to the reading position 38 (S62). The image reading unit 14 successively reads the images of the transported documents 39 (S63). Images are formed from the read images in the first mode, and the image formation is completed (S64). A paper sheet with the images formed in the first mode, or the fast copy mode, can be output at an increased speed.

In S52, if the documents 39 have not been loaded in the loading position of the ADF 22 (NO in S52) and the document-holder open/close detecting unit 59 detects that the document holder 40 was opened (YES in S53), the placed-document detecting unit 37b detects that a document 39 has been placed in position on the document table 51. Then, an image of the document 39 on the document table 51 is read (S65). Specifically, the image reading unit 14 reads the image of the document 39 on the document table 51 by moving the carriage 52 in the sub-scanning direction. As with the case of the documents 39 loaded in the ADF 22, an image is formed in the first mode based on the read image, and the image forming operation is completed (S64). A paper sheet with the image formed in the first mode, or the fast copy mode, can be output at an increased speed.

In this embodiment, the predetermined period of time in which the document-holder open/close detecting unit 59 operates to detect the opening or closing of the document holder 40 is set to start from the last image formation until the depression of the start key 32; however, the present disclosure is not limited thereto, and for example, the predetermined period of time may be set so as to start a few minutes before the start key 32 is depressed until the depression of the start key 32. By setting the time as described above, detection derived from other users' behavior to merely open or close the ADF 22 can be excluded, and therefore the risk of wasting paper sheets can be further reduced.

Although images are read line by line to determine the presence or absence of the document image in the embodiment, the present disclosure is not limited thereto, the determination can be made by reading the images on a certain area basis.

Although the digital multifunction peripheral 11 in this embodiment is configured to form images in the first mode or second mode, the present invention is not limited thereto, and the digital multifunction peripheral 11 can be configured to form images still in the aforementioned third mode whenever documents 39 have not been loaded in the loading position of the ADF 22 irrespective of the presence or absence of a document 39 on the document table 51.

It should be understood that the embodiments and examples disclosed herein are illustrative and non-restrictive in every respect. The scope of the present disclosure is defined by the terms of the claims, rather than by the foregoing disclosure, and is intended to include any modifications within the scope and meaning equivalent to the terms of the claims.

The image forming apparatus according to the present disclosure can be effectively used especially to meet a demand for the reduction of wasted paper sheets. In addition, the image forming apparatus according to the present disclosure can be effectively used especially to meet a demand for the reduction of wasted paper sheets and a demand to simplify users' operability.

Furthermore, the image forming apparatus according to the present disclosure can be effectively used especially to meet a demand for the reduction of wasted paper sheets and a demand for image formation of a document left behind on a document table.

What is claimed is:

1. An image forming apparatus comprising:
   an image reader that includes
      a document transporting device that transports a document loaded in a loading position to a reading position,
      a loaded-document detector that detects whether the document has been loaded in the loading position,
      a document table on which the document to be read is placed,
      a document holder that can be closed to cover an upper surface of the document table and can be opened to make a space above the document table, has a white back face facing the document table, and holds the document placed on the document table, and
      a document-holder position detector that detects whether the document holder was opened within a predetermined period of time, the image reader reading an image of at least one of the document loaded in the document transporting device and the document placed on the document table;
   an image former that forms an image based on the image read by the image reader;
   an acceptor that accepts a request for the image former to perform image formation based on detecting a depression of a start key;
   a paper transporter that transports a paper sheet on which the image is to be formed to the image former;
   a mode selector that can select at least one of a first mode in which the paper transporter starts transporting a paper sheet when the image reader starts reading the image and a second mode in which the paper transporter starts transporting a paper sheet after the image reader finishes reading the image;
   a first controller that, when the acceptor accepts an image formation request, controls the mode selector to select the second mode and controls the image reader to read an image on the document table if the loaded-document detector detects that the document has not been loaded in the loading position and the document-holder position detector detects that the document holder was not opened within the predetermined period of time; and
   a second controller that, if the loaded-document detector detects that the document has been loaded in the loading position while the first controller is in operation, controls the document transporting device to transport the document in the loading position to the reading position while controlling the mode selector to select the first mode, and controls the image former to form an image based on the image of the document transported by the document transporting device and read by the image reader, wherein the predetermined period of time is set to start from a last image formation by the image former until the depression of the start key.

2. The image forming apparatus according to claim 1, wherein the second controller controls the image reader to abort reading the image on the document table and to read an image of the document transported by the document transporting device.

3. The image forming apparatus according to claim 1, wherein the acceptor includes an input setter through which settings for images to be formed by the image former are input, and the second controller controls the image former to form an image based on the image of the document read by the image reader in accordance with the settings input through the input setter.

4. The image forming apparatus according to claim 1, wherein the first controller includes a determiner that determines whether the image on the document table read by the image reader is a white image, and the second controller controls the image former to form the image when the determiner determines that the image on the document table is a white image.

* * * * *